(12) United States Patent
Chen et al.

(10) Patent No.: US 9,837,853 B2
(45) Date of Patent: Dec. 5, 2017

(54) CONTROL APPARATUS, DEVICE AND METHOD FOR POWER MANAGEMENT FOR SAME

(75) Inventors: Dong Chen, Shanghai (CN); Song Ye, Shanghai (CN); Xiaozhong Lin, Shanghai (CN)

(73) Assignee: SHANGHAI TURIN SMART ROBOT CO., LTD., Shanghai (CN)

( * ) Notice: Subject to any disclaimer, the term of this patent is extended or adjusted under 35 U.S.C. 154(b) by 1113 days.

(21) Appl. No.: 13/885,999

(22) PCT Filed: Oct. 31, 2011

(86) PCT No.: PCT/CN2011/081572
§ 371 (c)(1),
(2), (4) Date: Aug. 21, 2013

(87) PCT Pub. No.: WO2012/088955
PCT Pub. Date: Jul. 5, 2012

(65) Prior Publication Data
US 2013/0328401 A1    Dec. 12, 2013

(30) Foreign Application Priority Data
Dec. 31, 2010    (CN) .......................... 2010 1 0620195

(51) Int. Cl.
H02J 7/34    (2006.01)
H02J 9/00    (2006.01)
H02J 9/06    (2006.01)

(52) U.S. Cl.
CPC ................ *H02J 9/00* (2013.01); *H02J 9/061* (2013.01); *Y10T 307/615* (2015.04)

(58) Field of Classification Search
CPC  H01H 2300/018; H02J 2003/001; H02J 7/34; H02J 9/04; Y10T 307/469
(Continued)

(56) References Cited

U.S. PATENT DOCUMENTS 6,304,005 B1* 10/2001 Aoki .................... H02J 9/06
                                                  307/116
6,944,002 B2*  9/2005 Serrano ................ H01H 89/06
                                                  361/104
(Continued)

FOREIGN PATENT DOCUMENTS

CN    2718882    8/2005
CN    1848598    10/2006
(Continued)

*Primary Examiner* — Daniel Kessie
(74) *Attorney, Agent, or Firm* — Schwabe Williamson & Wyatt, PC

(57) ABSTRACT

A device and a method for power management of a control apparatus, which control apparatus comprises: a main power source (10), a backup power source (11) and a functional circuit (12). The functional circuit outputs detection information. The power management device comprises a selection circuit (20) suitable for choosing the main power source or the backup power source to supply power to the functional circuit; and a control circuit (21), suitable for switching off the power supply pathway from the backup power source to the functional circuit when the selection circuit chooses the backup power source for supplying power but has not received a trigger signal, and for switching on the power supply pathway from the backup power source to the functional circuit when the selection circuit chooses the backup power source for supplying power and has received a trigger signal.

20 Claims, 6 Drawing Sheets

(58) Field of Classification Search
USPC .......................................... 307/64; 700/295
See application file for complete search history.

(56) References Cited

U.S. PATENT DOCUMENTS

| | | | |
|---|---|---|---|
| 7,382,062 B2 | 6/2008 | Affaticati et al. | |
| 8,648,494 B2* | 2/2014 | Chiang | H02J 9/061 307/64 |
| 2005/0017582 A1* | 1/2005 | Young | G09G 3/3413 307/64 |
| 2008/0174181 A1* | 7/2008 | Kuo | H02J 9/06 307/80 |

FOREIGN PATENT DOCUMENTS

| | | |
|---|---|---|
| CN | 101261761 | 9/2008 |
| CN | 101771284 | 7/2010 |
| JP | 2004350407 | 12/2004 |
| KR | 10-20090037554 | 4/2009 |

* cited by examiner

CONTROL APPARATUS, DEVICE AND METHOD FOR POWER MANAGEMENT FOR SAME

CROSS REFERENCE TO RELATED APPLICATIONS

The present application is a Section 371 National Stage Application of International Application No. PCT/CN2011/081572, filed on Oct. 31, 2011, which claims priority to Chinese patent application No. 201010620195.1, filed on Dec. 31, 2010, and entitled "CONTROL APPARATUS, DEVICE AND METHOD FOR POWER MANAGEMENT FOR SAME", the entire disclosure of which is incorporated herein by reference.

FIELD OF THE DISCLOSURE

The present disclosure generally relates to industrial control field, and more particularly, to a control apparatus, a device and a method for power management for same.

BACKGROUND OF THE DISCLOSURE

In earlier times, relay control system was dominant in industrial control fields. Generally, the relay control system operates sequentially according to a predetermined time or condition. If the control sequence needs to be changed, the wiring of the relay control system has to be changed accordingly, which is inconvenient and inflexible.

In the 1960s, computer technology came into use in the industrial control field. However, due to its high cost, complexity in programming, and difficulty to work in the harsh industrial environment, computer technology is not widely applied in the industrial control field.

With the growth of needs in industrial control fields, control apparatuses come into being. The control apparatus is a master device which controls an electromotor to start, regulate speed, brake and reverse by changing wirings and resistance of a main circuit or a control circuit according to a predetermined sequence. Control apparatuses cooperate with other apparatus, such as sensors and actuators, to be applied in various industrial equipments.

Typically, industrial equipments are used in complex applications with various requirements. Many applications require that a control apparatus can operate normally powered by a backup power supply when losing its main power supply. However, the backup power supply generally has a low power, just like batteries, which can not sustain the control apparatus to work for a long time with high power consumption. Therefore, it is important to provide a power module with a low power consumption design for the control apparatus.

With the growth of technology, there are more and more strict requirements for low power consumption design for a power supply of an industry apparatus. To address this issue, switching to a backup power supply once a power-off of the main power supply is monitored is provided in later solutions. However, the power consumption of the backup power supply is not reduced with the later solutions.

Improvements have been made to the later solutions in the existing technology, in which circuits of the control apparatus are divided into two parts: one part which stops working once the main power supply is cut off, and the other part which still needs to work normally powered by a backup power supply. Compared with the later solution, power consumption of the backup power supply is reduced, but not to the least.

U.S. Pat. No. 7,382,062B2 provides a stabilized wide voltage range power supply for actuators, which realizes to convert a single power input into three power supplies. However, this disclosure fails to disclose low power consumption design for the power supply.

Chinese patent application No. 200610025600.9 provides a method and device to realize dual processing system for an actuator control system, which divides the control system into a master processing system and a processing system with mini power consumption. If an external power supply (namely, main power supply) is cut off, the master processing system stops working, while the processing system with mini power consumption is powered by an interior power supply (namely, backup power supply), which reduces power consumption of the interior power supply. However, in case that the interior power supply has a low power or is a battery, power consumption of the power supply as disclosed is still very high and needs to be further reduced.

SUMMARY

Embodiments of the present disclosure aim to solve the problems of a large power consumption when a backup power supply is utilized to supply power in prior art.

One embodiment of the present disclosure provides a power management device of a control apparatus. The power management device may include: a main power supply, a backup power supply, and a functional circuit which is configured to output detection information, the power management device further including:

a selection circuit, configured to select the main power supply or the backup power supply to supply power to the functional circuit; and a control circuit, configured to cut off the backup power supply to the functional circuit when the selection circuit selects the backup power supply to supply power and no trigger signal is received, or to wire in the backup power supply to the functional circuit when the selection circuit selects the backup power supply to supply power and a trigger signal is received.

In some embodiments, the functional circuit includes a first circuit relevant to the trigger signal and a second circuit irrelevant to the trigger signal, the first circuit being configured to output the detection information; wherein the control circuit is configured to cut off the backup power supply to the first circuit when the selection circuit selects the backup power supply to supply power and no trigger signal is received, and the control circuit wire in the backup power supply to the first circuit when the selection circuit selects the backup power supply to supply power and a trigger signal is received; and wherein the control circuit is further configured to cut off the backup power supply to the second circuit if the backup power supply is utilized to supply power.

In some embodiments, the control circuit is further configured to wire in the main power supply to the functional circuit when the selection circuit selects the main power supply to supply power.

In some embodiments, the control circuit may include: a control unit, configured to output a control signal when the main power supply is cut off and the detection information remains unchanged for a first predetermined time period; a logic unit, configured to output a first cut-off signal when the control signal is received and no trigger signal is received, and to output a first turn-on signal when the main power supply is utilized to supply power or to output the first turn-on signal when the main power supply is cut off and the trigger signal is received; and a first switching unit, including a first input terminal coupled to a power supply selected by the selection circuit, a first output terminal coupled to a power input terminal of the functional circuit and a power input terminal of the control unit respectively, and a first control terminal coupled to the logic unit, where when the first control terminal receives the first cut-off signal, the first input terminal is disconnected from the first output terminal, and when the first control terminal receives the first turn-on signal, the first input terminal is coupled to the first output terminal.

In some embodiments, the control unit is further configured to output the control signal when the main power supply is just cut off and no trigger signal is received within a second predetermined time period since the backup power starts to supply power.

In some embodiments, the control circuit further includes a monitoring unit of the main power supply, configured to output a power-off signal to the control unit and the logic unit when the main power supply is cut off.

In some embodiments, the logic unit includes: a 3-input OR gate, a 2-input AND gate, and a 2-input OR gate, where a first input end of the 3-input OR gate connects to an output end of the 2-input AND gate, a second input end of the 3-input OR gate is applied to the trigger signal, and a third input end of the 3-input OR gate connects to an output end of the monitoring unit; where a first input end of the 2-input AND gate connects to an output end of the 3-input OR gate, and a second input end of the 2-input AND gate connects to an output end of the control unit; and where a first input end of the 2-input OR gate connects to the output end of the 2-input AND gate, a second input end of the 2-input OR gate connects to the output end of the monitoring unit, an output end of the 2-input OR gate connects to the first control terminal of the first switching unit.

In some embodiments, the functional circuit includes a first circuit relevant to the trigger signal and a second circuit irrelevant to the trigger signal, the first circuit is configured to output the detection information; wherein the control unit is configured to output a second cut-off signal during the backup power supply supplies power, otherwise, output a second turn-on signal; wherein the control circuit further includes: a second switching unit, including a second input terminal which connects to the first output terminal of the first switching unit, a second output terminal which connects to a power input terminal of the second circuit, and a second control terminal which is coupled to the control unit, where when the second control terminal receives the second cut-off signal, the second input terminal disconnects from the second output terminal, and when the second control terminal receives the second turn-on signal, the second input terminal connects to the second output terminal.

In some embodiments, the first circuit includes a third circuit for outputting the detection information, a fourth circuit, a voltage-regulating circuit for outputting a first voltage, and a voltage-converting circuit for converting the first voltage to a second voltage, where an input terminal of the voltage-regulating circuit connects to the first output terminal of the first switching unit, an output terminal of the voltage-regulating circuit respectively connects to a power input terminal of the third circuit, the second input terminal of the second switching unit and an input terminal of the voltage-converting circuit, and an output terminal of the voltage-converting circuit connects to a power input terminal of the fourth circuit and the power input terminal of the control unit.

In some embodiments, the control circuit may include: a switch control unit, configured to output the first cut-off signal when the main power supply is cut off, and the detection information remains unchanged for a first predetermined time period, and no trigger signal is received, and to output the first turn-on signal when the main power supply is utilized to supply power or to output the first turn-on signal when the main power supply is cut off and the trigger signal is received; a first switching unit, including a first input terminal which connects to a power supply selected by the selection circuit, a first output terminal which connects to a power input terminal of the functional circuit, and a first control terminal which connected to the switch control unit; where when the first control terminal receives the first cut-off signal, the first input terminal disconnects from the first output terminal, and when the first control terminal receives the first turn-on signal, the first input terminal connects to the first output terminal.

In some embodiments, the switch control unit is further configured to output the first cut-off signal when the main power supply is just cut off, and no trigger signal is received within a second predetermined time period since the backup power supply starts to supply power.

In some embodiments, the control unit further includes a monitoring unit of the main power supply, configured to output a power-off signal to the switch control unit when the main power supply is cut off.

In some embodiments, the functional circuit may include a first circuit relevant to the trigger signal and a second circuit irrelevant to the trigger signal, the first circuit is configured to output the detection information; wherein the switch control unit is configured to output a second cut-off signal when the backup power supply is utilized to supply power, otherwise, output a second turn-on signal; wherein the control circuit further includes: a second switching unit, including a second input terminal which is connected to the first output terminal of the first switching unit, a second output terminal which is connected to a power input terminal of the second circuit, and a second control terminal which is connected to the switch control unit; where if the second control terminal receives the second cut-off signal, the second input terminal is disconnected from the second output terminal, and if the second control terminal receives the second turn-on signal, the second input terminal is connected with the second output terminal.

In some embodiments, the first circuit may include a third circuit for outputting the detection information, a fourth circuit, a voltage-regulating circuit for outputting a first voltage, and a voltage-converting circuit for converting the first voltage to a second voltage, where an input terminal of the voltage-regulating circuit is connected to the first output terminal of the first switching unit, an output terminal of the voltage-regulating circuit is respectively connected to a power input terminal of the third circuit, the second input terminal of the second switching unit and an input terminal of the voltage-converting circuit, and an output terminal of the voltage-converting circuit is connected to a power input terminal of the fourth circuit.

Another embodiment of the present disclosure provides a control apparatus, including a main power supply, a backup power supply and a functional circuit, wherein the control apparatus further includes a power management device described above.

In some embodiments, the trigger signal is generated by a position sensor sensing rotation of a shaft, and the detection information includes position information.

In some embodiments, the control apparatus further includes a display backlight circuit which is powered merely by the main power supply, and a display displaying the position information which is powered by the main power supply or the backup power supply.

In some embodiments, the trigger signal is generated by a vibration sensor sensing vibration, and the detection information includes vibration information.

In some embodiments, the trigger signal is generated by a wind speed sensor sensing variation of wind speed, and the detection information includes wind speed information.

In some embodiments, the trigger signal is generated by a temperature sensor sensing variation of ambient temperature, and the detection information includes temperature information.

In some embodiments, the trigger signal is generated by a humidity sensor sensing variation of ambient humidity, and the detection information includes humidity information.

In some embodiments, the control apparatus further includes a display backlight circuit which is powered merely by the main power supply, and a display and a wireless communication module which are powered by the main power supply or the backup power supply.

Another embodiment of the present disclosure provides a power management method for a control apparatus, where the control apparatus includes: a main power supply, a backup power supply, and a functional circuit which is configured to output detection information. The method includes: cutting off the backup power supply to the functional circuit when the selection circuit selects the backup power supply to supply power and no trigger signal is received; and wiring in the backup power supply to the functional circuit when the selection circuit selects the backup power supply to supply power and a trigger signal is received.

In some embodiments, the method further includes: wiring in the main power supply to the functional circuit when the selection circuit selects the main power supply to supply power.

In some embodiments, the method further includes: cutting off the backup power supply to the functional circuit when the main power supply is cut off and the detection information remains unchanged for a first predetermined time period and no trigger signal is received.

In some embodiments, the method further includes: cutting off the backup power supply to the functional circuit when the main power supply is cut off and no trigger signal is received within a second predetermined time period since the backup power supply starts to supply power.

Another embodiment of the present disclosure provides a power management method for a control apparatus, where the control apparatus includes: a main power supply, a backup power supply, and a functional circuit which is configured to output detection information. The method includes: dividing the functional circuit into a first circuit relevant to the trigger signal and a second circuit irrelevant to the trigger signal, the first circuit being configured to output the detection information; cutting off the backup power supply to the first circuit when the selection circuit selects the backup power supply to supply power and no trigger signal is received; wiring in the backup power supply to the first circuit when the selection circuit selects the backup power supply to supply power and a trigger signal is received; and cutting off the backup power supply to the second circuit when the backup power supplies power.

In some embodiments, the method further includes wiring in the main power supply to the functional circuit when the selection circuit selects the main power supply to supply power.

In some embodiments, the method further includes cutting off the backup power supply to the first circuit when the main power supply is cut off and the detection information remains unchanged for a first predetermined time period and no trigger signal is received.

In some embodiments, the method further includes cutting off the backup power supply to the first circuit when the main power supply is just cut off and no trigger signal is received within a second predetermined time period since the backup power supply starts to supply power.

Compared with the prior art, embodiments of this disclosure have the following advantages:

According to the power management device for a control apparatus according to embodiments of the present disclosure, by utilizing a control circuit, the functional circuit may be powered by the backup power supply upon the receipt of a trigger signal, while not powered by the backup power supply if no trigger signal is received. That is, the functional circuit may be triggered to work by the trigger signal, and stop working without receipt the trigger signal. Thus, the functional circuit does not need to work all the time, thereby reducing the power consumption when the backup power supply supplies power in the event that the main power supply is cut off.

By dividing the functional circuit into a first circuit relevant to the trigger signal and a second circuit irrelevant to the trigger signal, the first circuit is triggered to work, while the second circuit stops working when the backup power supply supplies power. That is, only a part of the functional circuit can work according to the trigger signal, the rest circuit stops working, thereby further reducing the power consumption.

The control circuit further includes a control unit and a logic unit. When the functional circuit stops working, the control unit stops working as well, thereby further reducing the power consumption.

By utilizing the above power management device, the control apparatus is able to reduce the power consumption of the backup power supply.

The power management method according to embodiments of the disclosure, when the backup power supply supplies power, the functional circuit may be powered by the backup power supply upon the receipt of a trigger signal, while not powered by the backup power supply if no trigger signal is received. The operation of the functional circuit depends on the generation of the trigger signal. That is, the functional circuit may be triggered to work by the trigger signal, and stop working without receipt the trigger signal. Thus, the functional circuit does not need to work all the time, thereby reducing the power consumption when the backup power supply supplies power in the event that the main power supply is cut off.

The method further divides the functional circuit into a first circuit relevant to the trigger signal and a second circuit irrelevant to the trigger signal, the first circuit is triggered to work, while the second circuit stops working when the backup power supply supplies power. That is, only a part of the functional circuit may work according to the trigger signal, the rest circuit stops working, thereby further reducing the power consumption.

DETAILED DESCRIPTION OF THE DISCLOSURE

Figure 1:
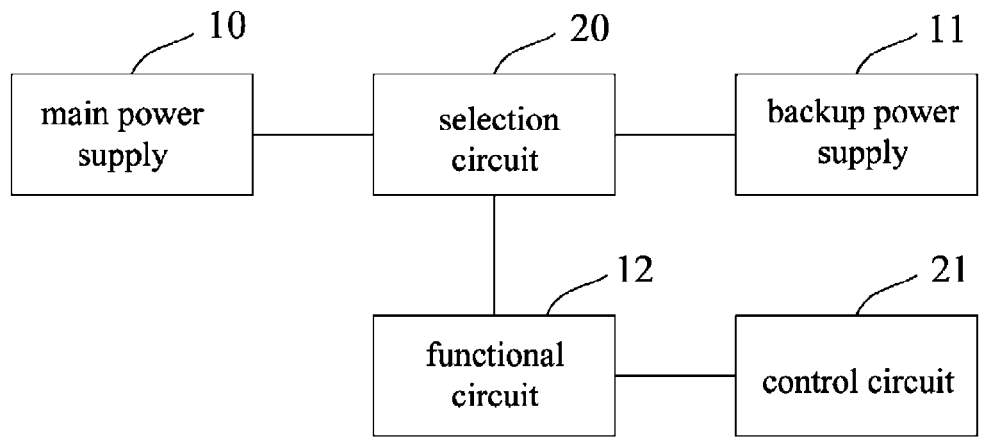
FIG. 1 is a schematic block diagram of a control apparatus and a power management device thereof according to one embodiment of the present disclosure.

In industrial control field, a power supply for a control apparatus is typically 380VAC or 220VAC. And the power supply is often converted through a transformer and a rectifier bridge to an output mainly 24VDC or 12VDC to power a control apparatus. The 24VDC power supply is usually used to supply elements which realize an isolation between the control apparatus and outside when they transfer signals with each other. For example, the 24VDC power supply supplies to a relay or an optocoupler. A main power supply to interior functional circuits is mainly from a conversion, such as 5VDC or 3.3VDC from 12VDC to power circuits and chips of a control apparatus. A backup power supply is typically 9VDC, which may be a battery, a backup DC power supply and the like.

Conventionally, a backup power supply power a control apparatus once a main power supply is cut off, however, which fails to reduce the power consumption of the backup power supply. In order to reduce the power consumption of the backup power supply, the existing solution divides circuits of the control apparatus into two parts: one part which stops working when the main power supply is cut off, and the other part which still works powered by a backup power supply. The power consumption of the backup power supply is reduced by the solution. However, in the case that the backup power supply has a low power or is a battery, the power consumption is still high comparatively.

It is found that when a control apparatus is in operation, functional circuits of the control apparatus don't need to work in some cases or during some periods when the main power supply is cut off. In addition, not all of the functional circuits powered by the backup power supply need to work. Accordingly, it is possible to control functional circuits to work by a trigger signal which is generated in some cases or during some periods. Besides, the functional circuits may be further defined when is powered by the backup power supply: including a first circuit relevant to the trigger signal and a second circuit irrelevant to the trigger signal. When the backup power source is supplying power, the second circuit may be controlled to not work, and the first circuit may be controlled to stop working if no detection information is fed back since the first circuit works for a period of time. That is, the functional circuits can be controlled to be switched on/off in real time when powered by the backup power supply, which thereby ensures a real low power consumption.

In order to clarify the objects, characteristics and advantages of the disclosure, embodiments of present disclosure will be described in detail hereinafter.

The following embodiments depict detailed features to make the disclosure more readily understanding. Other embodiments may be utilized, and other changes may be made, without departing from the spirit or scope of the subject matter presented here. Therefore, the following embodiments are not to be considered limiting of its scope.

Referring to FIG. 1, FIG. 1 is a schematic block diagram of a control apparatus and a power management device thereof according to one embodiment of the present disclosure. As shown in FIG. 1, the control apparatus includes a main power supply 10, a backup power supply 11 and a functional circuit 12 which outputs detection information, such as information of position, vibration, wind speed, temperature, humidity and the like. The power management device includes a selection circuit 20 and a control circuit 21. The selection circuit 20 is configured to select the main power supply 10 or the backup power supply 11 to supply the functional circuit 12. When the selection circuit 20 selects the backup power supply 11, the control circuit 21 is configured to cut off the backup power supply 11 to the functional circuit 12 when no trigger signal is received, or to wire in the backup power supply 11 to the functional circuit 12 when a trigger signal is received. In other words, while the backup power supply 11 is utilized to supply power, the control circuit 21 is triggered by the trigger signal to control the backup power supply 11 to selectively supply power to the functional circuit 12. Thus, the whole functional circuit 12 doesn't need to work all the time when powered by the backup power supply 11, which thereby reduces power consumption and prolongs service life of the backup power supply 11.

The trigger signal may be generated by a position sensor sensing a rotation of a shaft, or by a vibration sensor sensing a vibration of the apparatus, or by a wind speed sensor sensing a variation of wind speed, or by a temperature sensor sensing a variation of ambient temperature, or by a humidity sensor sensing a variation of ambient humidity, and so on.

The control circuit 21 cutting off the backup power supply 11 to the functional circuit 12 means cutting off the backup power supply 11 to at least a part of the functional circuit 12, and the control circuit 21 wiring in the backup power supply 11 to the functional circuit 12 means wiring in the backup power supply 11 to at least a part of the functional circuit 12. In other words, when powered by the backup power supply 11, either a part of or the whole functional circuit 12 can be triggered to work by the trigger signal.

In some embodiments, the functional circuit may be divided into: a first circuit relevant to the trigger signal and a second circuit irrelevant to the trigger signal. The first circuit is configured to output the detection information. The control circuit cutting off the backup power supply to the functional circuit means cutting off the backup power supply to the first circuit, and the control circuit wiring in the backup power supply to the functional circuit means wiring in the backup power supply to the first circuit. The control circuit is further configured to cut off the backup power supply to the second circuit if the backup power supply is wired in to supply power. The first circuit is a part of the functional circuit which processes trigger signals or information relating to trigger signals and outputs detection information relating to the trigger signal.

In some embodiments, the control circuit 21 is further configured to wire in the main power supply 10 to the functional circuit 12 if the selection circuit 20 selects the main power supply 10 to supply power. The functional circuit 12 is in working as long as the main power supply 10 supplies power. In some embodiments, the control circuit 21 may also be configured to selectively control the main power supply 10 to supply power to the functional circuit 12 while the main power supply 10 is utilized to supply power, which is a kind of power supply low power consumption design for the main power supply and is not described in detail in the present disclosure which mainly relates to the low power consumption design of the backup power supply.

Figure 2:
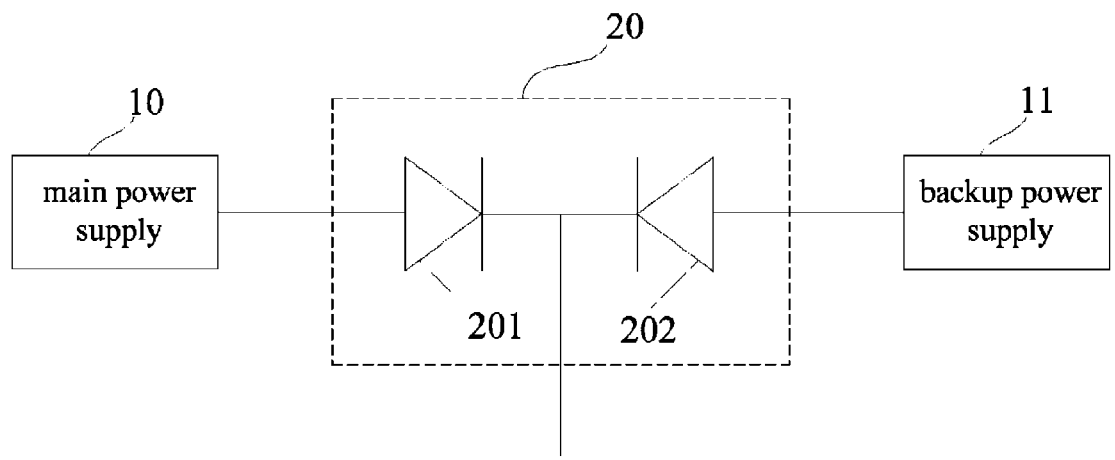
FIG. 2 is schematic circuit diagram of a selection circuit according to one embodiment of the present disclosure.

Referring to FIG. 2, FIG. 2 is schematic circuit diagram of a selection circuit according to one embodiment of the present disclosure. In some embodiments, the selection circuit 20 may includes a first diode 201 and a second diode 202. The cathode of the first diode 201 connects to the cathode of the second diode 202, the anode of the first diode 201 connects to the main power supply 10, and the anode of the second diode 202 is coupled to the backup power supply 11. Here, a main power supply of 12VDC and a backup power supply of 9VDC are taken as an example. When 12VDC is applied to the anode of the first diode 201 and 9VDC is applied to the anode of the second diode 202, the first diode 201 is on and the second diode 202 is off. Thus, the selection circuit 20 outputs 12VDC. If the main power supply of 12VDC is cut off, the second diode 202 is on and the selection circuit 20 outputs 9VDC.

It should be noted that an example of the selection circuit 20 is provided as described above, and other circuits may be utilized in other embodiments as long as the selection circuit can output a backup power supply when a main power supply is cut off, which is not intended to limit the scope of the disclosure.

Figure 3:
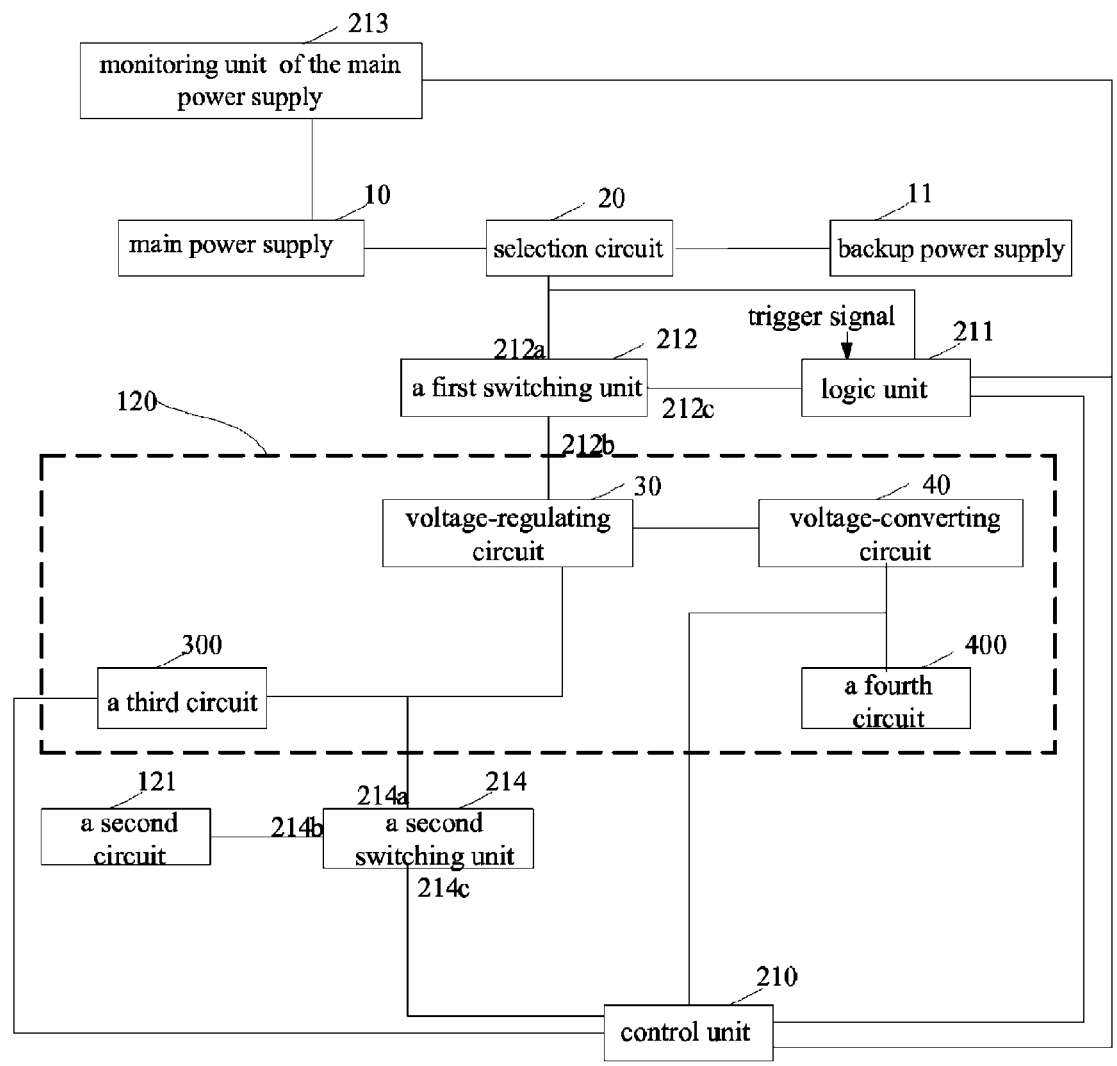
FIG. 3 is a schematic structural diagram of a control apparatus and a power management device thereof according to a first embodiment of the present disclosure.

FIG. 3 is a schematic structural diagram of a control apparatus and a power management device thereof according to a first embodiment of the present disclosure. Referring to FIG. 1 and FIG. 3, the control apparatus includes a main power supply 10, a backup power supply 11 and a functional circuit 12. The power management device of the control apparatus includes a selection circuit 20 and a control circuit 21. The control circuit 21 includes a control unit 210, a logic unit 211 and a first switching unit 212.

The control unit 210 is configured to output a control signal when the main power supply 10 is cut off and the detection information remains unchanged for a first predetermined time period.

The logic unit 211 is configured to output a first cut-off signal when the control signal is received and no trigger signal is received, and to output a first turn-on signal if the main power supply 10 is utilized to supply power or to output a first turn-on signal when the main power supply 10 is cut off and a trigger signal is received.

The first switching unit 212 includes a first input terminal 212a which is connected to a power supply (the main or backup power supply) selected by the selection circuit 20, a first output terminal 212b which is connected to a power input terminal of the functional circuit 12 and a power input terminal of the control unit 210, and a first control terminal 212c which is connected to the logic unit 211. When the first control terminal 212c receives the first cut-off signal, the first input terminal 212a and the first output terminal 212b are switched off, and when the first control terminal 212c receives the first turn-on signal, the first input terminal 212a and the first output terminal 212b are switched on.

The control unit 210 outputs the control signal in two cases. Firstly, when the main power supply 10 is cut off, the detection information output from the functional circuit 12 stays the same with that before the main power supply 10 is cut off. If the detection information remains unchanged for the first predetermined time period, the control unit 210 outputs the control signal. Secondly, when the main power supply 10 is cut off, the functional circuit 12 is connected to the backup power supply 11, that is, the functional circuit 12 can work using the backup power supply 11. If the detection information remains unchanged for the first predetermined time period, the control unit 210 outputs the control signal. The first predetermined time period may be preset according to practical situations, such as 10 minutes, 30 minutes, etc.

Further, the control unit 210 is configured to output a control signal when the main power supply 10 is just cut off and no trigger signal is received within a second predetermined time period since the backup power starts to supply power. In other words, if the main power supply 10 is just cut off and no trigger signal is received within the second predetermined time period since the backup power supply 11 starts to supply power, the functional circuit 12 is powered off and stops working; if the trigger signal is received within the second predetermined time period since the backup power supply 11 starts to supply power, the power supply to the functional circuit 12 is not switched off. When the main power supply 10 is cut off, the backup power supply starts to supply power to the functional circuit 12 for a period of time (namely, the second predetermined time period), so as to store the current data (such as the state of the control apparatus) into a nonvolatile memory. Therefore, the second predetermined time period may be preset according to the practical storage requirements. In some embodiments, the control unit 210 may be a control chip.

The logic unit 211 may be powered by the backup power supply 11. That is, the power input terminal of the logic unit 211 is connected to the backup power supply 11 through the selection circuit 20. In some embodiments, the logic unit 211 may be made up of low-powered components, so the logic unit 211 is low powered.

In order to monitor whether the main power supply is cut off or not, the control circuit further includes a monitoring unit 213 of the main power supply. The monitoring unit 213 is configured to output a power-off signal to the control unit 210 and the logic unit 211 when the main power supply 10 is cut off, and output a power-on signal to the control unit 210 and the logic unit 211 when the main power supply 10 is supplying power. The monitoring unit 213 is configured to determine whether the main power supply is cut off or not, and send the determination result to the control unit 210 and the logic unit 211. In some embodiments, the monitoring unit 213 is not included in the control circuit 21. The logic unit may be configured to monitor whether the main power supply is cut off or not, and send the monitoring result to the control unit 210.

Figure 4:
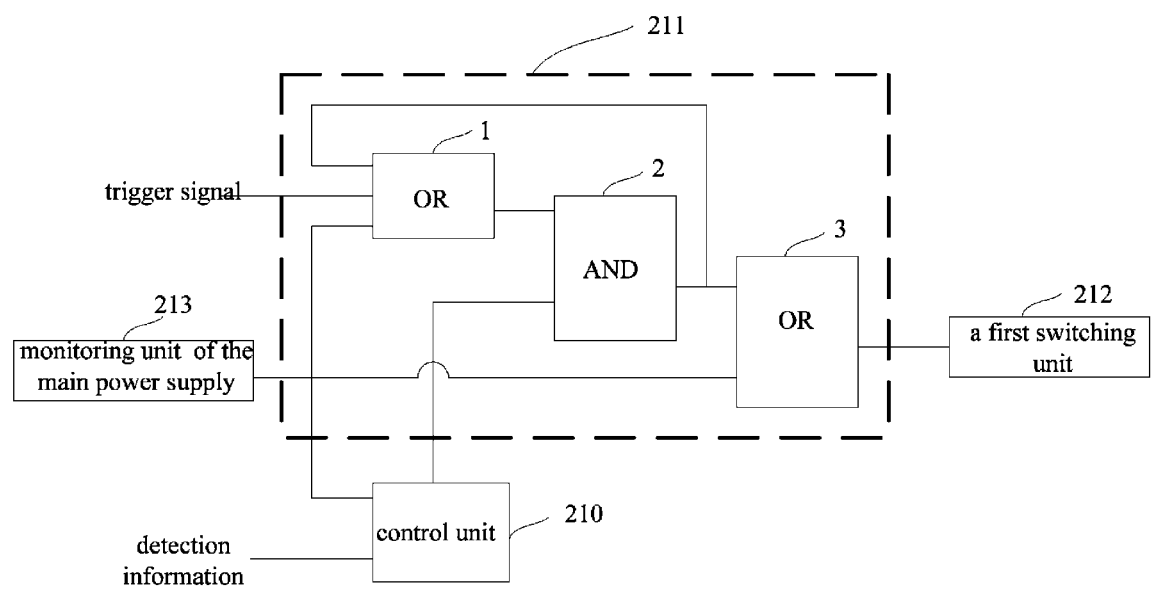
FIG. 4 is schematic circuit diagram of a logic unit according to one embodiment of the present disclosure.

FIG. 4 is schematic circuit diagram of a logic unit according to one embodiment of the present disclosure. Referring to FIG. 4, the logic unit includes a 3-input OR gate 1, a 2-input AND gate 2, and a 2-input OR gate 3.

A first input end of the 3-input OR gate 1 connects to an output end of the 2-input AND gate, a second input end of the 3-input OR gate 1 is applied to the trigger signal, and a third input end of the 3-input OR gate 1 connects to an output end of the monitoring unit 213 of the main power supply.

A first input end of the 2-input AND gate 2 connects to an output end of the 3-input OR gate 1, and a second input end of the 2-input AND gate 2 connects to an output end of the control unit 210.

A first input end of the 2-input OR gate 3 connects to the output end of the 2-input AND gate 2, a second input end of the 2-input OR gate 3 connects to the output end of the monitoring unit 213 of the main power supply, an output end of the 2-input OR gate 3 connects to the first control terminal of the first switching unit 212.

When the monitoring unit 213 of the main power supply determines that the main power supply 10 is supplying power, the monitoring unit 213 outputs a power-on signal (logic high in the first embodiment) to the second input end of the 2-input OR gate 3. In this case, the output of the logic unit 211 depends on the 2-input OR gate 3, and the logic unit 211 outputs the first turn-on signal, namely, a logic high voltage level. In other words, when the main power supply 10 is supplying power, the logic unit 211 outputs the first turn-on signal.

When the monitoring unit 213 of the main power supply determines that the main power supply 10 is cut off, the monitoring unit 213 outputs a power-off signal (logic low in the first embodiment) to the third input end of the 3-input OR gate 1 and the second input end of the 2-input OR gate 3. If there is a trigger signal (logic high in the first embodiment) generated, the 3-input OR gate 1 outputs a logic-high voltage level. The control unit 210 may output a control signal (logic low in the first embodiment) if the main power supply 10 is cut off and the detection information remains unchanged for the first predetermined time period. In other cases, if there is a trigger signal generated, causing the corresponding detection information changed, the control unit 210 may output a logic-high voltage level, i.e. the second input end of the 2-input AND gate 2 inputs a logic-high voltage level, so the 2-input AND gate 2 outputs a logic-high voltage level. As for the 2-input OR gate 3, the first input end is logic high, while the second input end is logic low, so the 2-input OR gate 3 outputs a logic-high voltage level, namely, the first turn-on signal. In other words, when the main power supply 10 is cut off and the trigger signal is received, the logic unit 211 outputs the first turn-on signal.

The control unit 210 may output a control signal (logic low in the first embodiment) if the main power supply 10 is cut off and the detection information remains unchanged for a first predetermined time period, which is input into the second input end of the 2-input AND gate 2, so the 2-input AND gate 2 outputs a logic-low voltage level, and the logic low voltage level is input into the first input end of the 3-input OR gate 1 accordingly. As for the other input ends of the 3-input OR gate 1, when the monitoring unit 213 of the main power supply determines that the main power supply 10 is cut off, the monitoring unit 213 outputs a power-off signal (logic low in the first embodiment) to the third input end of the 3-input OR gate 1. At this time, if there is no trigger signal generated, a logic-low voltage level is input into the second input end of the 3-input OR gate 1. Accordingly, the 3-input OR gate 1 outputs a logic-low voltage level. As for the 2-input OR gate 3, the first input end is logic low from the output of the 2-input AND gate 2, and the second input end is logic low which is the power-off signal output from the monitoring unit 213. Accordingly, the 2-input OR gate 3 outputs a logic-low voltage level, namely, the first cut-off signal. In other words, when the control signal is received while the trigger signal is not received, the logic unit 211 outputs the first cut-off signal.

In some embodiments, the control unit 210 outputs the control signal when the main power supply 10 is just cut off and no trigger signal is received within the second predetermined time period since the backup power starts to supply power, namely, outputs a logic-low voltage level to the second input end of the 2-input AND gate 2. Accordingly, the 2-input OR gate 3 outputs a logic-low voltage level, namely, the first cut-off signal. In the first embodiment, the output end of the control unit 210 (connected to the second input end of the 2-input AND gate 2) outputs a logic-low voltage level (namely, the control signal) if the main power supply 10 is cut off and the detection information remains unchanged for the first predetermined time period, or if the main power supply 10 is just cut off and no trigger signal is received within the second predetermined time period since the backup power supply starts to supply power. In other cases, the control unit 210 outputs a logic-high voltage level. In some embodiments, the control unit may be powered by the backup power supply 11. When the switching unit 212 is cut off by the cut-off signal, the power input terminal of the control unit 210 is disconnected from the backup power supply 11, so the control unit 210 outputs a logic-high voltage level.

It should be noted that the logic unit is not limited to the embodiments illustrated in FIG. 4. Other logic units made up of logic gates may be utilized in other embodiments as long as they have similar functions as described in the disclosure. Changes or variations may be applied to the types of the logic gates and connections therebetween according to logic high/low of the input signal.

The first switching unit 212 may be a power transistor, such as an NMOS transistor or a PMOS transistor. Here, an NMOS transistor is taken as an example. When a first control end (gate electrode) receives the first cut-off signal (namely, a logic-low voltage level), the NMOS transistor is cut off. A first input end (source electrode) is disconnected from a first output end (drain electrode) accordingly. That is, the backup power supply 11 is disconnected from the power input terminals of the functional circuit 12 and the control unit 210. The functional circuit 12 and the control unit 210 are then powered off. Alternatively, when the first control end (gate electrode) receives the first turn-on signal (namely, a logic-high voltage level), the NMOS transistor is turned on. The first input end (source electrode) is connected with the first output end (drain electrode) accordingly. That is, the backup power supply 11 is connected with the power input terminals of the functional circuit 12 and the control unit 210. The functional circuit 12 and the control unit 210 are powered on by the backup power supply 11.

In light of the above, when the main power supply 10 is supplying power, the logic unit 211 outputs the first turn-on signal to the first control terminal 212c of the first switching unit 212. Accordingly, the first input terminal 212a is connected with the first output terminal 212b and the main power supply 10 supplies power to the functional circuit 12 and the control unit 210.

When the main power supply 10 is just cut off and no trigger signal is received within the second predetermined time period since the backup power supply starts to supply power, the control unit 210 outputs the control signal. In this case, if no trigger signal is received, the logic unit outputs the first cut-off signal to the first control terminal 212c of the first switching unit 212, which disconnects the first input terminal 212a from the first output terminal 212b. At this time, although the backup power supply 11 is selected to supply power by the selection circuit 20, the backup power supply 11 fails to supply power to the functional circuit 12 and the control unit 210 since the first input terminal 212a is disconnected from the first output terminal 212b.

When the selection circuit 20 selects the backup power supply 11 to supply power and a trigger signal is received, the logic unit 211 outputs the first turn-on signal to the first control terminal 212c of the first switching unit 212, which connects the first input terminal 212a with the first output terminal 212b. In this case, the backup power supply 11 supplies power to the functional circuit 12 and the control unit 210.

While the backup power supply 11 is supplying power to the functional circuit 12, if the detection information output from the functional circuit 12 remains unchanged for the first predetermined time period, the control unit 210 outputs the control signal. In this case, if no trigger signal is received, the logic unit 211 outputs the first cut-off signal to the first control terminal 212c of the first switching unit 212, which disconnects the first input terminal 212a from the first output terminal 212b. Therefore, the backup power supply 11 stops supplying power to the functional circuit 12 and the control unit 210.

In conclusion, by utilizing the control unit 210 and the logic unit 211 to control the first switching unit 212, the backup power supply 11 can adjust power supply to the functional circuit 12 under different conditions. Specifically, only when a trigger signal is generated, the backup power supply 11 starts to supply power to the functional circuit 12. Besides, if the detection information from the functional circuit 12 remains unchanged, the backup power supply 11 stops supplying power to the functional circuit 12. In this manner, the power consumption of the backup power supply 11 is reduced.

Referring to FIG. 3, to further reduce the power consumption of the backup power supply 11, the functional circuit 12 is preferably divided into a first circuit 120 relevant to the trigger signal and a second circuit 121 irrelevant to the trigger signal. The first circuit 120 may be configured to output the detection information, or to output the detection information relating to the trigger signal. The control unit 210 is further configured to output a second cut-off signal if the backup power supply 11 is wired in to supply power, otherwise, output a second turn-on signal.

In some embodiments, the first circuit 120 may be a signal processing circuit to process the trigger signal. For example, if the trigger signal is a vibration signal, the first circuit 120 may be a vibration sensing circuit and output vibration information. If the trigger signal is a rotation signal of a shaft, the first circuit 120 may be a position sensing circuit relating to the shaft's rotation and output position information.

In some embodiments, the control circuit 21 may further include: a second switching unit 214. The second switching unit 214 includes a second input terminal 214a which connects to the first output terminal 212b of the first switching unit 212, a second output terminal 214b which connects to a power input terminal of the second circuit 121, and a second control terminal 214c which is coupled to the control unit 210. If the second control terminal 214c receives the second cut-off signal, the second input terminal 214a disconnects from the second output terminal 214b, and if the second control terminal 214c receives the second turn-on signal, the second input terminal 214a connects to the second output terminal 214b. Similar to the first switching unit 212, the second switching unit 214 may be a power transistor.

If the first input terminal 212a of the first switching unit 212 is connected with the first output terminal 212b, the backup power supply 11 supplies power to the functional circuit 12, namely, the backup power supply 11 supplies power to the first circuit 120 and the second circuit 121. In this case, the control unit 210 may output the second cut-off signal to the second control terminal 214c of the second switching unit 214, which disconnects the second input terminal 214a from the second output terminal 214b, namely, the power supply to the second circuit 121 irrelevant to the trigger signal is stopped. By dividing the functional circuit 12, the first circuit 120 relevant to the trigger signal is powered according to the trigger signal, while the second circuit 121 irrelevant to the trigger signal is not powered, thus the power consumption of the backup power supply 11 is further reduced, and the service life of the backup power supply 11 is extended.

In addition, circuits contained in the functional circuit 12 may work at different voltage levels separately. Accordingly, the first circuit 120 may further include a third circuit 300 for outputting the detection information, a fourth circuit 400, a voltage-regulating circuit 30 for outputting a first voltage, and a voltage-converting circuit 40 for converting the first voltage to a second voltage.

In some embodiments, an input terminal of the voltage-regulating circuit 30 connects to the first output terminal 212b of the first switching unit 212, an output terminal of the voltage-regulating circuit 30 connects to a power input terminal of the third circuit 300, the second input terminal 214a of the second switching unit 214 and an input terminal of the voltage-converting circuit 40, and an output terminal of the voltage-converting circuit 40 connects to a power input terminal of the fourth circuit 400 and the power input terminal of the control unit 210.

If the first input terminal 212a of the first switching unit 212 is connected with the first output terminal 212b, the backup power supply 11 supplies power to the functional circuit 12. Because different circuits of the functional circuit 12 require different voltage levels, the voltage provided by the backup power supply 11 needs to be converted into different voltage levels to be adapted for the different circuits by utilizing the voltage-regulating circuit 30 and the voltage-converting circuit 40. If a backup power supply of 9VDC is taken as an example, the 9VDC may be stabilized at a first voltage level of 5VDC by utilizing the voltage-regulating circuit 30, to supply power to the third circuit 300 relevant to the trigger signal and the second circuit 121 irrelevant to the trigger signal, which can work under 5VDC. In order to supply power to other circuits working at different voltages levels, the first voltage level of 5VDC may be converted into a second voltage level of 3.3VDC by utilizing the voltage-converting circuit 40, to supply power to the fourth circuit 400 relevant to the trigger signal and the control unit 210, which can work under 3.3VDC.

It should be noted that only one voltage-converting circuit is provided in the embodiment. If the functional circuit further includes other circuits working under voltage levels other than the second voltage, the first circuit may further include other voltage-converting circuits to convert the first voltage into voltage levels other than the second voltage. The magnitude of the first and second voltage levels depends on the ranges of working voltages of circuits contained in the functional circuit.

Figure 5:
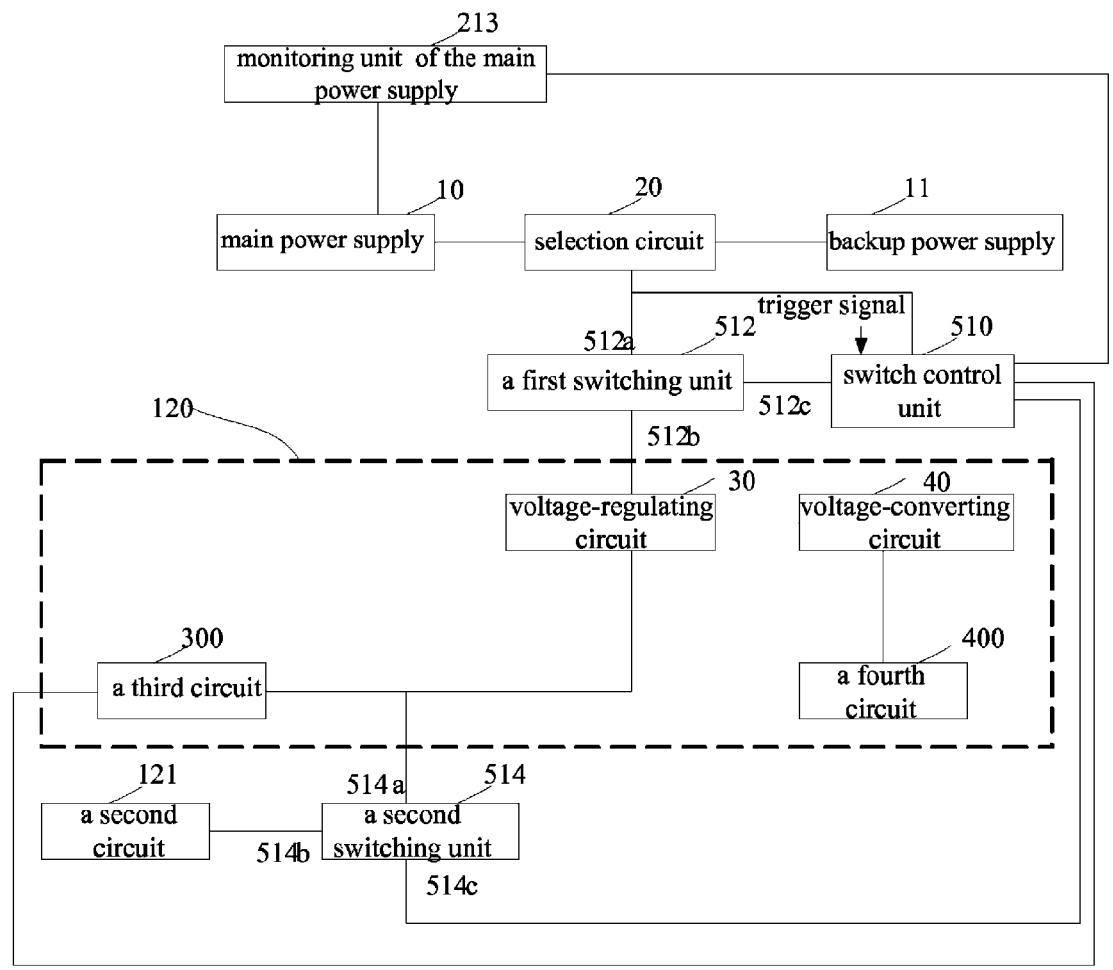
FIG. 5 is a schematic structural diagram of a control apparatus and a power management device thereof according to a second embodiment of the present disclosure.

FIG. 5 is a schematic structural diagram of a control apparatus and a power management device thereof according to a second embodiment of the present disclosure. The structure of the control circuit in FIG. 5 is a little different from that in FIG. 3. Referring to FIG. 1 and FIG. 5, the control circuit includes a switch control unit 510 and a first switching unit 512.

The switch control unit 510 is configured to output the first cut-off signal when the main power supply 10 is cut off and the detection information remains unchanged for a first predetermined time period and no trigger signal is received, and to output the first turn-on signal if the main power supply 10 is utilized to supply power or output the first turn-on signal when the main power supply 10 is cut off and the trigger signal is received.

The first switching unit 512 includes a first input terminal 512*a* which is configured to be connected to a power supply selected by the selection circuit 20, a first output terminal 512*b* which is connected to a power input terminal of the functional circuit 12, and a first control terminal 512*c* which is connected to the switch control unit 510. When the first control terminal 512*c* receives the first cut-off signal, the first input terminal 512*a* is disconnected from the first output terminal 512*b*, and when the first control terminal 512*c* receives the first turn-on signal, the first input terminal 512*a* is connected with the first output terminal 512*b*.

The switch control unit 510 may be powered by the backup power supply 11. That is, the power input terminal of the switch control unit 510 is connected to the backup power supply 11 through the selection circuit 20. Compared with the first embodiment shown in FIG. 3, the control unit 210 and the logic unit 211 are replaced with the switch control unit 510, resulting in a simple circuit structure which is easy to implement. In the first embodiment, the control circuit is divided into the control unit 210 and the logic unit 211, where the logic unit 211 is powered by the backup power supply 11 continuously, and the control unit 210 is selectively powered by the backup power supply 11, which is similar to the functional circuit, thus the power consumption of the backup power supply 11 can be further reduced.

Referring to FIG. 5, the control unit further includes a monitoring unit 213 of the main power supply, configured to output a power-off signal to the switch control unit 510 when the main power supply 10 is cut off. The functional circuit 12 includes a first circuit 120 relevant to the trigger signal and a second circuit 121 irrelevant to the trigger signal. The first circuit 120 is configured to output the detection information. The switch control unit 510 is further configured to output a second cut-off signal while the backup power supply 11 is supplying power, otherwise, output a second turn-on signal.

In some embodiments, the control circuit further includes a second switching unit 514. The second switching unit includes a second input terminal 514*a* which is connected to the first output terminal 512*b* of the first switching unit 512, a second output terminal 514*b* which is connected to a power input terminal of the second circuit 121, and a second control terminal 514*c* which is connected to the switch control unit 510. When the second control terminal 514*c* receives the second cut-off signal, the second input terminal 514*a* is disconnected from the second output terminal 514*b*, and when the second control terminal 514*c* receives the second turn-on signal, the second input terminal 514*a* is connected with the second output terminal 514*b*.

The first circuit 120 may further include a third circuit 300 for outputting the detection information, a fourth circuit 400, a voltage-regulating circuit 30 for outputting a first voltage, and a voltage-converting circuit 40 for converting the first voltage to a second voltage.

In some embodiments, an input terminal of the voltage-regulating circuit 30 is connected to the first output terminal 512*b* of the first switching unit 512, an output terminal of the voltage-regulating circuit 30 is connected to a power input terminal of the third circuit 300, the second input terminal 514*a* of the second switching unit 514 and an input terminal of the voltage-converting circuit 40, and an output terminal of the voltage-converting circuit 40 is connected to a power input terminal of the fourth circuit 400.

For better understanding the present application, two examples may be used to illustrate the control apparatus and a power management device thereof according to the first embodiment shown in FIG. 3. It should be noted that the two examples may be applicable to the second embodiment show in FIG. 5.

Figure 6:
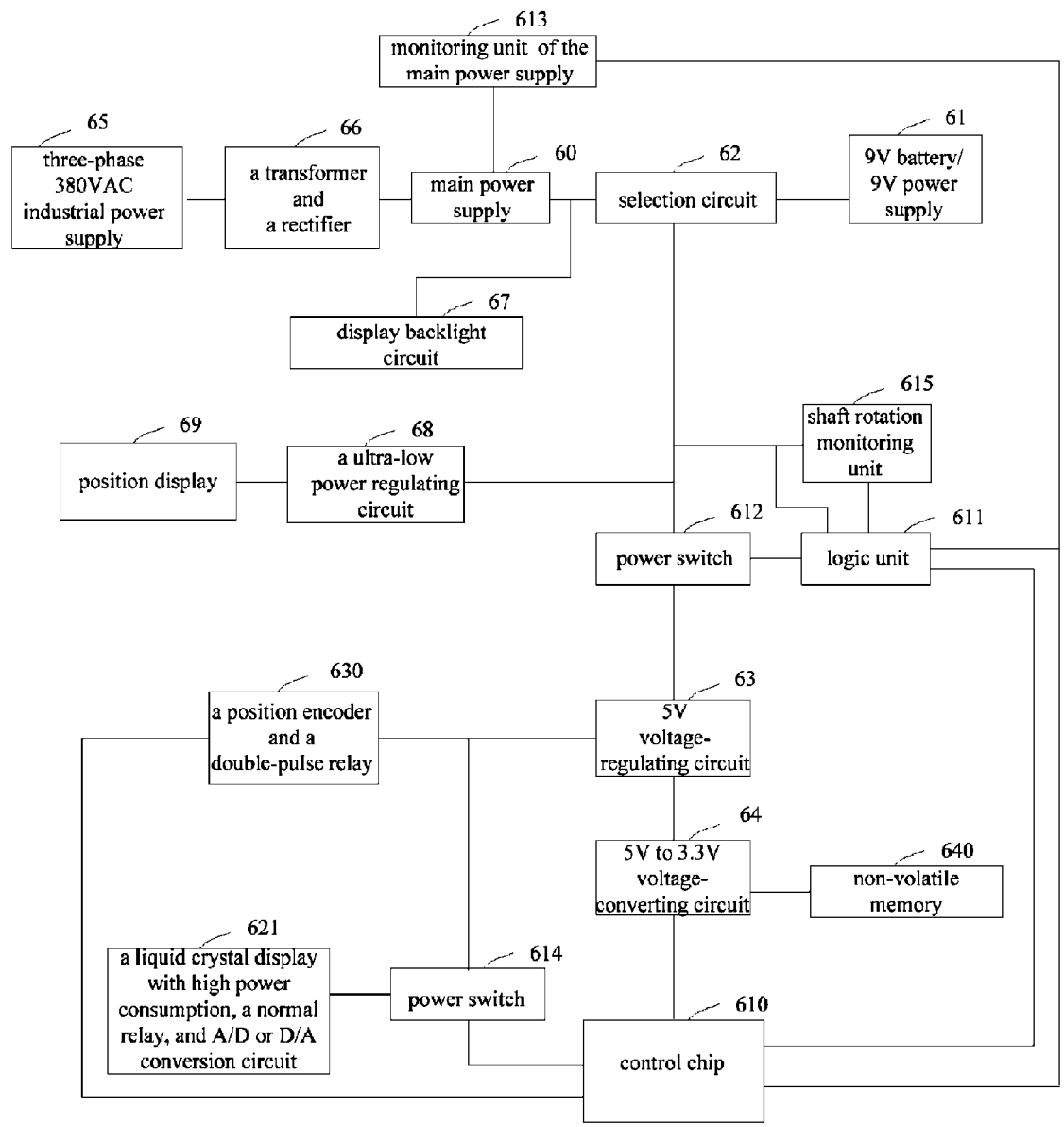
FIG. 6 is a schematic structural diagram of a position detection and display device and a power management device thereof according to one embodiment of the present disclosure.

Referring to FIG. 6, the control apparatus may be a position sensing and display apparatus, which is configured to detect open degree of a valve by detecting the valve's position and display the position. For example, material transmission system is able to control material flow by detecting the valve's position and controlling open degree of the valve accordingly.

Referring to FIG. 6, a monitoring unit 613 of the main power supply corresponds to the monitoring unit 213 in FIG. 3, a main power supply 60 corresponds to the main power supply 10, a selection circuit 62 corresponds to the selection circuit 20, a 9V battery/9V power supply 61 corresponds to the backup power supply 11, a trigger signal is generated from a shaft rotation monitoring unit 615, a power switch 612 corresponds to the first switching unit 212, a logic unit 611 corresponds to the logic unit 211, a 5V voltage-regulating circuit 63 corresponds to the voltage-regulating circuit 30, a position encoder and a double-pulse relay 630 corresponds to the third circuit 300, a 5V to 3.3V voltage-converting circuit 64 corresponds to the voltage-converting circuit 40, a non-volatile memory 640 corresponds to the fourth circuit 400, a power switch 614 corresponds to the second switching unit 214, a liquid crystal display with high power consumption, a normal relay, and A/D or D/A conversion circuit 621 corresponds to the second circuit 121, and a control chip 610 corresponds to the control unit 210.

Hereinafter, the power management device for the position sensing and display apparatus is described in detail in conjunction with the operation process of the position sensing and display apparatus.

As shown in FIG. 6, after the three-phase 380VAC power supply 65 used in industry is inputted, the 380VAC is converted into the main power supply 60 of 12VDC utilizing a transformer and a rectifier 66. The main power supply of 12VDC and the backup power supply of 9VDC are connected with the selection circuit 62. The 12VDC and 9VDC may be selected by the selection circuit 62 to supply power, thus preventing power flow backward in the case that the 12VDC and 9VDC are supplying power simultaneously. When the 12VDC is cut off, the 9VDC may be used to supply power to the position sensing and display apparatus. In some embodiments, monitoring units may be provided for the main or backup power supplies to feedback monitoring results to the control unit 610. In FIG. 6, the monitoring unit 613 of the main power supply is shown in the drawing, but that for the backup power supply is not shown.

The monitoring unit 613 of the main power supply is configured to provide a power-off signal to the logic unit 611 and the control chip 610 when the main power supply is cut off, so as to identify a current status of the main power supply. The monitoring result from the monitoring unit of the backup power supply is fed back to the control chip 610, so the control chip 610 may give an alarm in the case that the backup power supply runs low.

When the main power supply 12VDC is supplying power, the 12VDC power is supplied to a display backlight circuit 67 and a motor drive module (not shown in the drawing), which only work when the main power supply is on. If the main power supply is cut off, the above circuits stop working. The main power supply 12VDC may be converted into 3.3VDC utilizing a ultra-low power regulating circuit 68, so as to drive a position display 69 with low power consumption to work. The position display 69 may be configured to display the valve's position, which needs to work not only when the main power supply is on, but also when the backup power supply is on.

When the main power supply is on, the power switches 612, 614 are turned on. The 12VDC is converted into 5VDC by the voltage-regulating circuit 63, which is then supplied to the position encoder and the double-pulse relay 630, and the liquid crystal display with high power consumption, the normal relay, and A/D or D/A conversion circuit 621. The 12VDC is converted into 3.3VDC by the 5V to 3.3V voltage-converting circuit 64, which is then supplied to the non-volatile memory 640 and the control chip 610.

When the main power supply 12VDC is just cut off and the backup power supply has been supplying power for a second predetermined time period, and if no trigger signal is received within the second predetermined time period, the state of the control apparatus may be stored into the non-volatile memory 640. Then, the power switch 612 is cut off by the logic unit 611 controlled by the control chip 610, so as to stop the backup power supply 9VDC supplying power to the position encoder and the double-pulse relay 630, the liquid crystal display with high power consumption, the normal relay, and A/D or D/A conversion circuit 621, the non-volatile memory 640 and the control chip 610. In this case, the power switch 614 is still turned on.

If the main power supply 12VDC is cut off, the motor stops working, accordingly, the shaft connected to the valve stops rotating. In some cases, the shaft needs to be rotated manually so as to rotate the valve. For example, under emergency circumstances, the material supplied in industrial pipeline needs to be cut off by turning off the valve manually; or, if the valve is under test, the shaft needs to be rotated manually to test rotation of the valve. When the shaft is rotated manually, a position sensor in the shaft rotation monitoring unit 615, e.g. a magnetic reed switch, senses and sends a rotation signal to the logic unit 611. The logic unit 611 is triggered to turn on the power switch 612 according to the rotation signal. Thus, the backup power supply starts to supply power to the position encoder, the double-pulse relay 630, and the non-volatile memory 640. The position encoder may output the current position of the valve, and the double-pulse relay may send states of change of valve's positions, such as full open or full close state, to a remote control center through a communication module (not shown in the drawing). The remote control center may act based on the current position of the valve to control state of the valve's position. The non-volatile memory 640 may store the current position of the valve.

If the backup power supply 9VDC is supplying power and the power switch 612 is turned on, the control chip 610 cuts off the power switch 614. That is, the backup power supply 9VDC stops supplying power to circuits irrelevant to the shaft's rotation, such as the liquid crystal display with high power consumption, the normal relay, and A/D or D/A conversion circuit 621. By doing this, circuits are powered selectively according to the trigger signal, namely, circuits relevant to the trigger signal are powered on, while circuits irrelevant to the trigger signal are powered off, thus the power consumption of the backup power supply is reduced. After the backup power supply supplies power to the position encoder and the double-pulse relay 630 for a time period, if the position information output from the position encoder remains unchanged, the control chip 610 may control the logic unit 611 to cut off the power switch 612. Accordingly, the backup power supply 9VDC stops supplying power to the position encoder, the double-pulse relay 630, the non-volatile memory 640 and the control chip 610.

Figure 7:
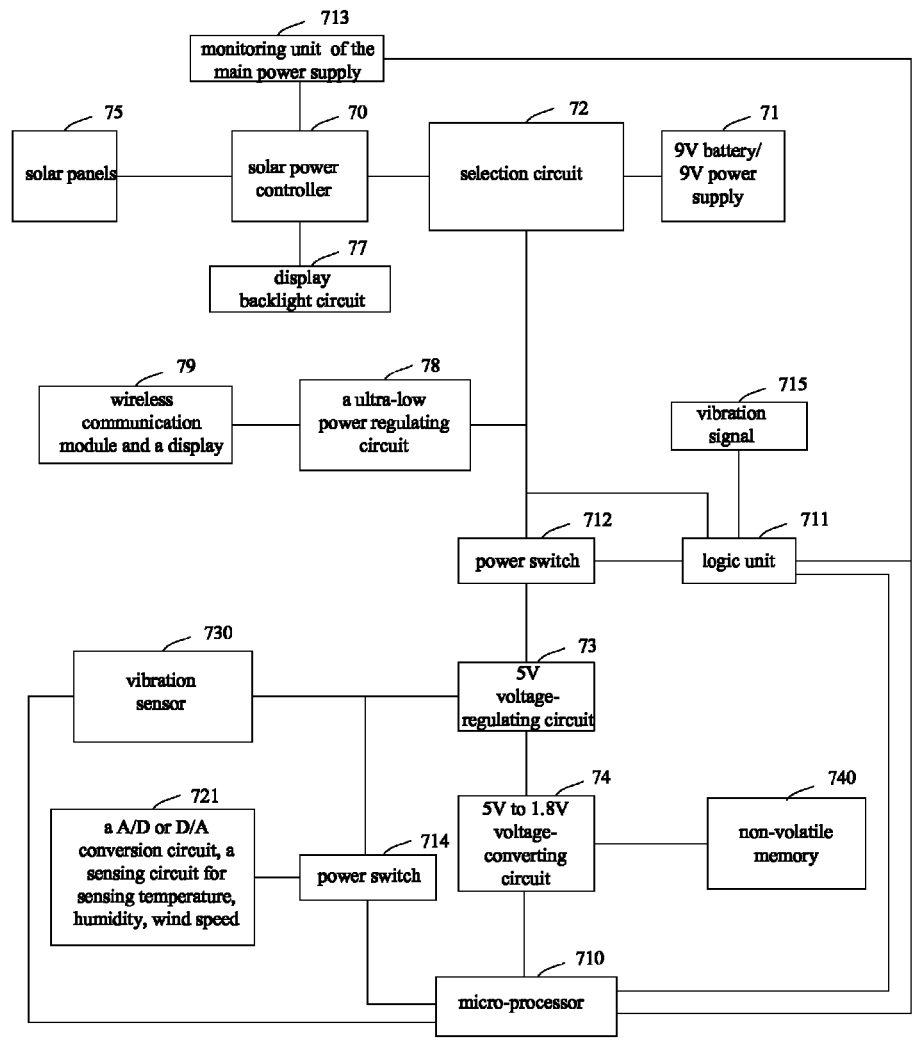
FIG. 7 is a schematic structural diagram of a monitoring and sensing device and a power management device thereof according to one embodiment of the present disclosure.

Referring to FIG. 7, FIG. 7 is a schematic structural diagram of a monitoring and sensing device and a power management device thereof according to one embodiment of the present disclosure.

Generally, the monitoring and sensing device mounted outdoors may be used to monitor transmission line or agriculture production environment. Typically, the monitoring and sensing device uses solar power for electricity. Data collected by sensors, such as information of temperature, humidity, wind speed and vibration, are processed by a micro-processor and sent through a wireless communication module (e.g. GPRS or WIFI module) to a control center for data exchange. In the case that solar energy is supplied normally, the monitoring and sensing device operates normally too. In the case that wet days continues for a long time, solar energy may be unable to maintain services, the monitoring and sensing device can operate normally by using the backup power supply.

Referring to FIG. 7, a solar power controller 70 corresponds to the main power supply 10 in FIG. 3, a selection circuit 72 corresponds to the selection circuit 20, a 9V battery/9V power supply 71 corresponds to the backup power supply 11, a vibration signal 715 corresponds to the trigger signal (which is generated by a vibration sensor when sensing a vibration, e.g., when someone moves the monitoring and sensing device), a power switch 712 corresponds to the first switching unit 212, a logic unit 711 corresponds to the logic unit 211, a 5V voltage-regulating circuit 73 corresponds to the voltage-regulating circuit 30, the vibration sensor 730 corresponds to the third circuit 300, a 5V to 1.8V voltage-converting circuit 74 corresponds to the voltage-converting circuit 40, a non-volatile memory 740 corresponds to the fourth circuit 400, a power switch 714 corresponds to the second switching unit 214, a A/D or D/A conversion circuit, a sensing circuit for sensing temperature, humidity, wind speed 721 corresponds to the second circuit 121, and a micro-processor 710 corresponds to the control unit 210.

Hereinafter, the power management device for the monitoring and sensing device is described in detail in conjunction with the operation process of the monitoring and sensing device.

As shown in FIG. 7, after solar panels 75 convert solar energy to electricity, the electricity is converted into the main power supply 12VDC utilizing the solar power controller 70. The main power supply 12VDC and the backup power supply 9VDC are connected with the selection circuit 72. The 12VDC and 9VDC may be selected by the selection circuit 72 to supply power, thus preventing power flow backward in the case that the 12VDC and 9VDC are supplying power simultaneously. If the 12VDC is cut off, the 9VDC may be used to supply power to the monitoring and sensing device. In some embodiments, monitoring units of the main or backup power supply may be provided to feedback monitoring results to the micro-processor 710. In FIG. 6, a monitoring unit 713 of the main power supply (solar power controller 70) is shown in the drawing, but that for the backup power supply is not shown in the drawing.

The monitoring unit 713 of the main power supply is configured to provide a power-off signal to the logic unit 711 and the micro-processor 710 when the main power supply is cut off, so as to identify a current status of the main power supply. The monitoring result from the monitoring unit of the backup power supply is fed back to the micro-processor 710, so the micro-processor 710 may give an alarm in the case that the backup power supply runs low.

When the main power supply 12VDC is supplying power, the 12VDC power is supplied to a display backlight circuit 77, which circuits are operating only in the case that the main power supply is on. If the main power supply is cut off, the above circuits stop operation. The main power supply 12VDC may be converted into 3.3VDC utilizing a ultra-low power regulating circuit 78, so as to drive a wireless communication module and a display 79 to operate, which circuit needs to operate in the case that the main power supply or the backup power supply is on. The display may be configured to display information of temperature, humidity, wind speed or vibration. The wireless communication module may send the processed information to the control center for exchange with data stored in the control center.

When the main power supply is on, the power switches 712, 714 are turned on. The 12VDC is converted into 5VDC by the voltage-regulating circuit 73, which power is then supplied to the vibration sensor 730, and the A/D or D/A conversion circuit, the sensing circuit for sensing temperature, humidity, wind speed 721. The 12VDC is converted into 1.8VDC by the 5V to 1.8V voltage-converting circuit 74, which power is then supplied to the non-volatile memory 740 and the micro-processor 710.

When the main power supply 12VDC is cut off and the backup power supply is supplying power for a second predetermined time period, and if no trigger signal is received within the second predetermined time period, the state of the control apparatus may be stored into the non-volatile memory 740. The power switch 712 is cut off by logic unit 711 controlled by the micro-processor 710, so as to stop supplying the backup power supply 9VDC to the vibration sensor 730, the A/D or D/A conversion circuit, the sensing circuit for sensing temperature, humidity, wind speed 721, the non-volatile memory 740 and the micro-processor 710.

When the main power supply 12VDC is cut off, if someone moves the monitoring and sensing device, a vibration sensor may detect and send a vibration signal to the logic unit 711. The logic unit 711 is triggered to turn on the power switch 712 according to the vibration signal. Thus, the backup power supply starts to supply power to the vibration sensor 730, and the non-volatile memory 740. The vibration sensor 730 is configured to process the vibration signal and output vibration information, and the non-volatile memory 740 may store the current vibration information.

When the backup power supply 9VDC is supplying power and the power switch 712 is turned on, the micro-processor 710 controls to cut off the power switch 714. That is, the backup power supply 9VDC stops supplying power to circuits irrelevant to vibration, such as the A/D or D/A conversion circuit, the sensing circuit for sensing temperature, humidity, wind speed 721. By doing this, circuits are powered selectively according to the trigger signal, namely, circuits relevant to the trigger signal are powered, while circuits irrelevant to the trigger signal are not powered, thus the power consumption of the backup power supply is reduced. After the backup power supply supplies power to the vibration sensor 730 for a time period, if the vibration information output from the vibration sensor 730 remains unchanged, the micro-processor 710 may control the logic unit 711 to turn off the power switch 712. Accordingly, the backup power supply 9VDC stops supplying power to the vibration sensor 730, the non-volatile memory 740 and the micro-processor 710.

Therefore, the continuous vibration can be detected by supplying power to circuits relevant to the trigger signal which is triggered by the trigger signal. The detection information may be sent to a control center through a wireless communication module, thus preventing the monitoring and sensing device against theft.

It should be noted, besides the vibration information, other information may be used as the trigger signal. In some embodiments, the trigger signal may be generated by a wind speed sensor when sensing a variation of wind speed. The wind speed sensing circuits may be triggered by the logic unit 711 and the micro-processor 710 to operate for obtaining wind speed information, while other circuits stops operation. In some embodiments, the trigger signal is generated by a temperature sensor when sensing a variation of ambient temperature. The temperature sensing circuits may be triggered by the logic unit 711 and the micro-processor 710 to operate for obtaining temperature information, while other circuits stops operation. In some embodiments, the trigger signal is generated by a humidity sensor when sensing a variation of ambient humidity. The humidity sensing circuits may be triggered by the logic unit 711 and the micro-processor 710 to operate for obtaining humidity information, while other circuits stops operation.

Based on the control apparatus and a power management device thereof described above, a power management method for a control apparatus is further provided according to one embodiment of the present disclosure. The control apparatus includes a main power supply, a backup power supply, and a functional circuit which is configured to output detection information.

In some embodiments, the method includes: cutting off the backup power supply to the functional circuit when the selection circuit selects the backup power supply to supply power and no trigger signal is received; and wiring in the backup power supply to the functional circuit when the selection circuit selects the backup power supply to supply power and a trigger signal is received.

Based on the control apparatus and a power management device thereof described above, a power management method for a control apparatus is further provided according to another embodiment of the present disclosure. The control apparatus includes a main power supply, a backup power supply, and a functional circuit which is configured to output detection information.

In some embodiments, the method includes:

dividing the functional circuit into a first circuit relevant to the trigger signal and a second circuit irrelevant to the trigger signal, the first circuit being configured to output the detection information;

cutting off the backup power supply to the first circuit when the selection circuit selects the backup power supply to supply power and no trigger signal is received;

wiring in the backup power supply to the first circuit when the selection circuit selects the backup power supply to supply power and a trigger signal is received; and cutting off the backup power supply to the second circuit when the backup power supplies power.

To sum up, according to the power management device for a control apparatus according to embodiments of the present disclosure, by utilizing a control circuit, the functional circuit may be powered by the backup power supply upon the receipt of a trigger signal, while not powered by the backup power supply if no trigger signal is received. That is, the functional circuit may be triggered to work by the trigger signal, and stop working without receipt the trigger signal. Thus, the functional circuit does not need to work all the time, thereby reducing the power consumption when the backup power supply supplies power in the event that the main power supply is cut off.

The control circuit further includes a control unit and a logic unit. When the functional circuit stops working, the control unit stops working as well, thereby further reducing the power consumption.

By dividing the functional circuit into a first circuit relevant to the trigger signal and a second circuit irrelevant to the trigger signal, the first circuit is triggered to work, while the second circuit stops working when the backup power supply supplies power. That is, only a part of the functional circuit can work according to the trigger signal, the rest circuit stops working, thereby further reducing the power consumption.

By utilizing the above power management device, the control apparatus is able to reduce the power consumption of the backup power supply.

The power management method according to embodiments of the disclosure, when the backup power supply supplies power, the functional circuit may be powered by the backup power supply upon the receipt of a trigger signal, while not powered by the backup power supply if no trigger signal is received. The operation of the functional circuit depends on the generation of the trigger signal. That is, the functional circuit may be triggered to work by the trigger signal, and stop working without receipt the trigger signal. Thus, the functional circuit does not need to work all the time, thereby reducing the power consumption when the backup power supply supplies power in the event that the main power supply is cut off.

The method further divides the functional circuit into a first circuit relevant to the trigger signal and a second circuit irrelevant to the trigger signal, the first circuit is triggered to work, while the second circuit stops working when the backup power supply supplies power. That is, only a part of the functional circuit may work according to the trigger signal, the rest circuit stops working, thereby further reducing the power consumption.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A power management device of a control apparatus, the control apparatus comprising: a main power supply, a backup power supply, and a functional circuit which is configured to output detection information, the power management device comprising:
    a selection circuit, configured to select the main power supply or the backup power supply to supply power to the functional circuit; and
    a control circuit, wherein the control circuit comprises a first switching unit connected between the selection circuit and the functional circuit, and the control circuit is configured to cut off the backup power supply to the functional circuit via the first switching unit when the selection circuit selects the backup power supply to supply power and no trigger signal is received, or to wire in the backup power supply to the functional circuit via the first switching unit when the selection circuit selects the backup power supply to supply power and a trigger signal is received,
    wherein the control circuit comprising;
    a control unit, configured to output a control signal when the main power supply is cut off and the detection information remains unchanged for a first predetermined time period;
    a logic unit, configured to output a first cut-off signal when the control signal is received and no trigger signal is received, and to output a first turn-on signal when the main power supply is utilized to supply power or to output the first turn-on signal when the main power supply is cut off and the trigger signal is received; and
    the first switching unit, comprising a first input terminal coupled to a power supply selected by the selection circuit, a first output terminal coupled to a power input terminal of the functional circuit and a power input terminal of the control unit respectively, and a first control terminal coupled to the logic unit, where when the first control terminal receives the first cut-off signal, the first input terminal is disconnected from the first output terminal, and when the first control terminal receives the first turn-on signal, the first input terminal is coupled to the first output terminal.

2. The power management device according to claim 1, wherein the functional circuit comprises a first circuit relevant to the trigger signal and a second circuit irrelevant to the trigger signal, the first circuit being configured to output the detection information;
    wherein the control circuit is configured to cut off the backup power supply to the first circuit when the selection circuit selects the backup power supply to supply power and no trigger signal is received, and the control circuit wire in the backup power supply to the first circuit when the selection circuit selects the backup power supply to supply power and a trigger signal is received; and
    wherein the control circuit is further configured to cut off the backup power supply to the second circuit if the backup power supply is utilized to supply power.

3. The power management device according to claim 1, wherein the control circuit is further configured to wire in the main power supply to the functional circuit when the selection circuit selects the main power supply to supply power.

4. The power management device according to claim 1 wherein the control unit is further configured to output the control signal when the main power supply is just cut off and no trigger signal is received within a second predetermined time period since the backup power starts to supply power.

5. The power management device according to claim 1, wherein the control circuit further comprises a monitoring unit of the main power supply, configured to output a power-off signal to the control unit and the logic unit when the main power supply is cut off.

6. The power management device according to claim 5, wherein the logic unit comprises: a 3-input OR gate, a 2-input AND gate, and a 2-input OR gate,
    where a first input end of the 3-input OR gate connects to an output end of the 2-input AND gate, a second input end of the 3-input OR gate is applied to the trigger signal, and a third input end of the 3-input OR gate connects to an output end of the monitoring unit;
    where a first input end of the 2-input AND gate connects to an output end of the 3-input OR gate, and a second input end of the 2-input AND gate connects to an output end of the control unit; and where a first input end of the 2-input OR gate connects to the output end of the 2-input AND gate, a second input end of the 2-input OR gate connects to the output end of the monitoring unit, an output end of the 2-input OR gate connects to the first control terminal of the first switching unit.

7. The power management device according to claim 1, wherein the functional circuit comprises a first circuit relevant to the trigger signal and a second circuit irrelevant to the trigger signal, the first circuit is configured to output the detection information;

wherein the control unit is configured to output a second cut-off signal during the backup power supply supplies power, otherwise, output a second turn-on signal;

wherein the control circuit further comprises:

a second switching unit, comprising a second input terminal which connects to the first output terminal of the first switching unit, a second output terminal which connects to a power input terminal of the second circuit, and a second control terminal which is coupled to the control unit, where when the second control terminal receives the second cut-off signal, the second input terminal disconnects from the second output terminal, and when the second control terminal receives the second turn-on signal, the second input terminal connects to the second output terminal.

8. The power management device according to claim 7, wherein the first circuit comprises a third circuit for outputting the detection information, a fourth circuit, a voltage-regulating circuit for outputting a first voltage, and a voltage-converting circuit for converting the first voltage to a second voltage, where an input terminal of the voltage-regulating circuit connects to the first output terminal of the first switching unit, an output terminal of the voltage-regulating circuit respectively connects to a power input terminal of the third circuit, the second input terminal of the second switching unit and an input terminal of the voltage-converting circuit, and an output terminal of the voltage-converting circuit connects to a power input terminal of the fourth circuit and the power input terminal of the control unit.

9. A control apparatus, comprising a main power supply, a backup power supply and a functional circuit, wherein the control apparatus further comprises a power management device, the power management device comprising:

a selection circuit, configured to select the main power supply or the backup power supply to supply power to the functional circuit; and a control circuit, wherein the control circuit comprises a first switching unit connected between the selection circuit and the functional circuit, and the control circuit is configured to cut off the backup power supply to the functional circuit via the first switching unit when the selection circuit selects the backup power supply to supply power and no trigger signal is received, or to wire in the backup power supply to the functional circuit via the first switching unit when the selection circuit selects the backup power supply to supply power and a trigger signal is received, wherein the control circuit comprising;

a control unit, configured to output a control signal when the main power supply is cut off and the detection information remains unchanged for a first predetermined time period;

a logic unit, configured to output a first cut-off signal when the control signal is received and no trigger signal is received, and to output a first turn-on signal when the main power supply is utilized to supply power or to output the first turn-on signal when the main power supply is cut off and the trigger signal is received; and the first switching unit, comprising a first input terminal coupled to a power supply selected by the selection circuit, a first output terminal coupled to a power input terminal of the functional circuit and a power input terminal of the control unit respectively, and a first control terminal coupled to the logic unit, where when the first control terminal receives the first cut-off signal, the first input terminal is disconnected from the first output terminal, and when the first control terminal receives the first turn-on signal, the first input terminal is coupled to the first output terminal.

10. The control apparatus according to claim 9, wherein the trigger signal is generated by a position sensor sensing rotation of a shaft, and the detection information comprises position information.

11. The control apparatus according to claim 10, further comprising a display backlight circuit which is powered merely by the main power supply, and a display displaying the position information which is powered by the main power supply or the backup power supply.

12. The control apparatus according to claim 9, wherein the trigger signal is generated by a vibration sensor sensing vibration, and the detection information comprises vibration information.

13. The control apparatus according to claim 9, wherein the trigger signal is generated by a wind speed sensor sensing variation of wind speed, and the detection information comprises wind speed information.

14. The control apparatus according to claim 9, wherein the trigger signal is generated by a temperature sensor sensing variation of ambient temperature, and the detection information comprises temperature information.

15. The control apparatus according to claim 9, wherein the trigger signal is generated by a humidity sensor sensing variation of ambient humidity, and the detection information comprises humidity information.

16. A power management method for a control apparatus, where the control apparatus comprises: a main power supply, a backup power supply, and a functional circuit which is configured to output detection information, the method comprising:

selecting the main power supply or the backup power supply to supply power to the functional circuit by a selection circuit;

cutting off the backup power supply to the functional circuit via a first switching unit connected between the selection circuit and the functional circuit, when the selection circuit selects the backup power supply to supply power and no trigger signal is received; and wiring in the backup power supply to the functional circuit via the first switching unit when the selection circuit selects the backup power supply to supply power and a trigger signal is received, a control unit, configured to output a control signal when the main power supply is cut off and the detection information remains unchanged for a first predetermined time period;

a logic unit, configured to output a first cut-off signal when the control signal is received and no trigger signal is received, and to output a first turn-on signal when the main power supply is utilized to supply power or to output the first turn-on signal when the main power supply is cut off and the trigger signal is received; and the first switching unit, comprising a first input terminal coupled to a power supply selected by the selection circuit, a first output terminal coupled to a power input terminal of the functional circuit and a power input terminal of the control unit respectively, and a first control terminal coupled to the logic unit, where when the first control terminal receives the first cut-off signal, the first input terminal is disconnected from the first output terminal, and when the first control terminal receives the first turn-on signal, the first input terminal is coupled to the first output terminal.

17. The power management method according to claim 16, further comprising:
   wiring in the main power supply to the functional circuit when the selection circuit selects the main power supply to supply power.

18. The power management method according to claim 16, further comprising:
   cutting off the backup power supply to the functional circuit when the main power supply is cut off and the detection information remains unchanged for a first predetermined time period and no trigger signal is received.

19. The power management method according to claim 16, further comprising cutting off the backup power supply to the functional circuit when the main power supply is cut off and no trigger signal is received within a first predetermined time period since the backup power supply starts to supply power.

20. The power management method according to claim 18, further comprising cutting off the backup power supply to the functional circuit when the main power supply is cut off and no trigger signal is received within a second predetermined time period since the backup power supply starts to supply power.

* * * * *